United States Patent [19]

Takekado et al.

[11] Patent Number: 4,864,447

[45] Date of Patent: Sep. 5, 1989

[54] LINEAR ACTUATOR FOR A MEMORY STORAGE APPARATUS

[75] Inventors: Shigeru Takekado, Tokyo; Yasuo Shima, Kawasaki, both of Japan

[73] Assignee: Kabushiki Kaisha Toshiba Corporation, Kanagawa, Japan

[21] Appl. No.: 150,285

[22] Filed: Jan. 29, 1988

[30] Foreign Application Priority Data

Apr. 3, 1987 [JP] Japan .................................. 62-81095

[51] Int. Cl.⁴ ............................................. G11B 21/08
[52] U.S. Cl. ...................................... 360/106; 310/13
[58] Field of Search ................. 360/106, 105, 104, 97, 360/98, 99; 310/12, 13

[56] References Cited

U.S. PATENT DOCUMENTS

| | | | |
|---|---|---|---|
| 3,505,544 | 4/1970 | Helms | 310/13 |
| 3,656,015 | 4/1972 | Gillum | 310/13 |
| 3,659,124 | 4/1972 | Lathrop | 310/13 |
| 3,735,163 | 5/1973 | Dijkstra et al. | 310/13 |
| 3,743,870 | 7/1973 | Hunt | 310/13 |
| 3,922,720 | 11/1975 | Caletti et al. | 360/106 |
| 4,058,844 | 11/1977 | Dirks | 360/106 |
| 4,075,517 | 2/1978 | Adler | 310/13 |
| 4,247,794 | 1/1981 | Jooss et al. | 310/13 |
| 4,287,445 | 9/1981 | Lienau | 310/13 |
| 4,305,105 | 12/1981 | Ho et al. | 360/106 |
| 4,344,022 | 8/1982 | von der Heide | 310/13 |
| 4,387,409 | 6/1983 | Otavsky et al. | 360/104 |
| 4,393,425 | 7/1983 | Wright | 360/105 |
| 4,414,594 | 11/1983 | Farmer et al. | 360/106 |
| 4,573,094 | 2/1986 | Gibeau et al. | 360/106 |
| 4,743,987 | 5/1988 | Farmer et al. | 360/106 |
| 4,760,480 | 7/1988 | Takekado | 360/106 |

FOREIGN PATENT DOCUMENTS

| | | | |
|---|---|---|---|
| 58-211363 | 12/1983 | Japan | 360/104 |
| 59-198568 | 11/1984 | Japan | 360/106 |
| 85-00476 | 1/1985 | PCT Int'l Appl. | 360/106 |
| 2129186 | 5/1984 | United Kingdom | 360/106 |

Primary Examiner—John H. Wolff
Assistant Examiner—Matthew J. Bussan
Attorney, Agent, or Firm—Banner, Birch, McKie & Beckett

[57] ABSTRACT

A linear actuator comprises a pair of central poles symmetrically arranged parallel to the direction of motion of a carriage for transducers. Four permanent magnets are disposed around each central pole leaving predetermined gaps. Four ambient poles and one terminal pole surround the permanent magnets and each central pole. Two driving coils are slidably movable in the predetermined gaps therebetween. Upper and lower flat plate members support the driving coils so they may be fixed to the carriage. The central poles each have a rectangular cross-section, the permanent magnets surrounding the exterior four walls of the central poles leaving the predetermined gaps in which the driving coils are disposed. The ambient poles and terminal poles surround the central poles and form closed magnetic circuits. The flat plate members of the carriage are composed of ceramic material. The driving coils, arranged inside the predetermined gaps, are mounted at the ends of the flat plate members. According to the above construction, the driving coils are entirely applied for driving the carriage. Moreover, due to the decrease in the quantity of the windings of each driving coil, and the light weight of the flat plate members, the carriage is light in weight while the linear actuator provides powerful actuation forces and achieves fast data access times. Furthermore, the pair of magnetic circuits ae closed as that the linear actuator reduces leakage flux and magnetic noise to a minimum.

14 Claims, 5 Drawing Sheets

LINEAR ACTUATOR FOR A MEMORY STORAGE APPARATUS

BACKGROUND OF THE INVENTION

I. Technical Field

The present invention relates to the design of a linear actuator for linearly moving a transducer to a particular location on memory storage apparatus, and, more particularly, to such an actuator comprising an improved drive coil and permanent magnet arrangement.

II. Description of the Prior Art

The need for a compact, high capacity magnetic or optical disk memory storage apparatus has generated considerable interest in recent years in improving the design of such information storage apparatus. One particularly bulky element of such magnetic or optical disk memory storage apparatus in the past has been the linear actuator for moving a transducer to a particular location on magnetic or optical disk media for retrieval of information stored on the disk. One such actuator for obtaining access to two sides of a disk is disclosed in U.S. Pat. No. 4,393,425. As is disclosed in the present FIG. 1 labeled Prior Art, this linear actuator comprises a yoke 22 which forms a magnetic circuit and is shaped in the form of a letter E including thin magnetic gaps 23a and 23b. The yoke 22 is arranged such that the magnetic gaps 23a and 23b are open in the direction of a magnetic disk 24. A carriage carrying transducers pointed toward disk 24 is arranged to be slidably coupled to guide rails such that a drive coil fixed to the carriage may slide in and out of gaps 23a and 23b. Because the E-shaped yoke 22 is open at two opposite sides, the magnetic circuit obtained generates a considerable amount of leakage flux. Consequently, there is a considerable amount of intentional separation between the magnetic disk 24 and yoke 22 to protect the disk from magnetic noise generated by the magnetic circuit. As a result, the disclosed actuator is somewhat large. Furthermore, two guide rails, one fixed and one mobile, each having a circular cross section, are disclosed as being biased by a single spring imposing the mobile guide rail against the carriage carrying three sets of rollers, and against the fixed guide rail. This arrangement is somewhat mechanically unstable and requires that the transducers carried by the carriage be loosely configured when the disk 24 is disposed therebetween, so that there is a rather large gap between the transducers.

Another known linear actuator which provides an improved structure for the aforementioned linear actuator is disclosed in U.S. Pat. No. 4,414,594. As is shown in the present FIG. 2 labeled Prior Art, this linear actuator has a pair of electromagnetic motors 30 that are symmetrically disposed in a winged formation about a carriage 31 carrying stacked pairs of transducers. According to the disclosed structure, the pair of electromagnetic motors 30 provide powerful and well-balanced actuation forces permitting a relatively small compact design. Furthermore, the carriage 31 transports at least three pairs of transducers shown directed toward at least three stacked disks. Consequently, this invention permits retrieval of information from two sides of each disk of a stack of disks. Also, carriage 31 is of very compact design. Referring more particularly to the carriage 31 arrangement for guiding, there is shown a pair of guide rails 37a and 37b of circular cross section similar in design to the earlier discussed actuator design. Biasing means 39 imposes mobile guide rail 37a against pairs of rollers associated with carriage 31 and fixed guide rail 37b in a similar manner to the prior art actuator shown in FIG. 1. Consequently, there is still no improvement in permitting more compact arrangement of the three pairs of transducers mounted on the carriage 31. Also, the actuator shown in FIG. 2 comprises similar magnetic circuits 32 shaped in the form of the letter E, so that only approximately half the length of the total length of drive coils 33 may be employed for providing actuation forces.

In view of the above, there is still a requirement to further improve upon the compact design and arrangement of linear actuator such that the weight of the carriage may be reduced, the magnetic actuation force efficiency improved, the guide rail arrangement made more mechanically stable, and the transducer arrangement supported by the carriage made more compact and easily maintainable such that the transducers may be effectively and precisely positioned over stacked disks of memory storage apparatus and easily replaced.

SUMMARY OF THE INVENTION

The above stated problems and related problems of prior art linear actuators are solved with the principles of the present invention, a linear actuator comprising an improved permanent magnet arrangement, guiding mechanism, and transducer arrangement. In particular, there is an especially light weight winged carriage comprising a mounting on each wing for first and second drive coils respectively.

These drive coils are permitted to travel within a completely surrounding block arrangement of permanent magnets and poles. There is a block arrangement associated with each drive coil such that there is a complete magnetic circuit surrounding each drive coil. Such a block arrangement permits a much more compact design of carriage, including transducer supports and drive coils, such that both the weight and size of the carriage are greatly reduced. Because of the weight and size reduction, the speed and efficiency of operation of the present linear actuator are improved. In connection with the design of guiding means for the carriage, an arrangement of two flat surfaced guide rails is suggested to replace one mobile guide rail of circular-cross section as taught by the prior art. Only one of the two flat surfaced guide rails is biased toward one roller of a pair of rollers, preferably the top guiding rollers, for the carriage. Furthermore, in connection with the design of the stack of transducers mounted on the carriage, it is suggested in the present invention to provide transverse mounting on transducer support arms such that the arms and transducers may be easily removed during periods of maintenance. In accordance with all of the above principles, the present linear actuator achieves a rapid access time while reducing leakage flux and magnetic noise. A compact size is achievable, not previously obtainable by prior art linear actuators.

DETAILED DESCRIPTION

Figure 3:
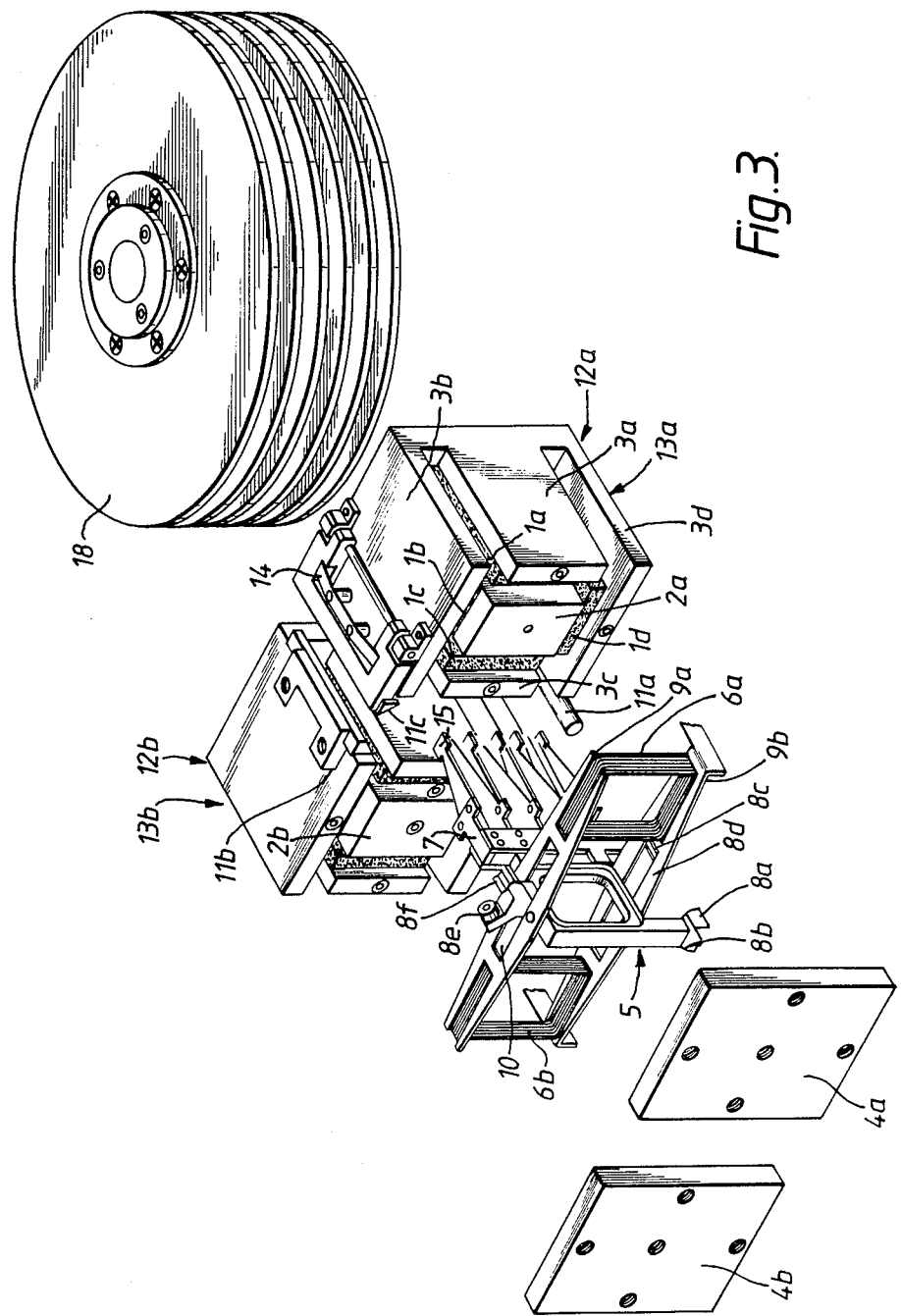
FIG. 3 is a disassembled perspective view of a linear actuator according to one embodiment of the present invention.

Referring more particularly to FIG. 3, there is shown a linear actuator in accordance with the present invention. The present linear actuator is shown mounted between terminal poles 4a and 4b and a stack of disks 18 which may be either magnetic or optical, but for the exemplary embodiment shown, are magnetic storage disks. Moveable carriage 5 is disposed within a complete magnetic circuit comprising first and second blocks such that plural pairs of transducers 15 may be extended within the stack of optical or magnetic disks 18 upon electrification of motors mounted on the carriage 5.

Referring now to the depicted first and second blocks, complete magnetic circuits are formed from central poles 2a and 2b and ambient poles 3a, 3b, 3c and 3d which completely surround the central poles 2a and 2b. Fixed terminal poles 4a and 4b are provided with appropriated recesses to temporarily if not permanently engage fixed mounting means mounted on the ambient poles. In this manner first and second closed magnetic circuits 12a and 12b are formed in the shapes of first and second blocks. Within the perimeters of magnetic circuits 12a and 12b, permanent magnets 1a, 1b, 1c and 1d are held in place by the ambient poles 3a, 3b, 3c and 3d,respectively. Located within the perimeters of the permanent magnets, the central poles 2a and 2b are each provided with an approximately rectangular cross section. Between the permanent magnets 1a, 1b, 1c and 1d and the central poles 2a and 2b are formed four gaps of predetermined size for receiving drive coils 6a and 6b mounted on carriage 5.

As may be seen from FIG. 3, drive coils 6a and 6b each respectively may surround central poles 2a and 2b and are completely disposed within the four gaps when the blocks are assembled. The permanent magnet pair 1a, 1c and the permanent magnet pair 1b, 1d are of approximately the same shape and size. Further, there is provided within magnetic circuit 12b two additional pairs of permanent magnets similar in size and shape to permanent magnets 1a, 1b, 1c and 1d of magnetic circuit 12a but which are not particularly identified. The pair of ambient poles 3b, 3d are wider than the associated permanent magnets 1b and 1d, but each ambient pole 3b or 3d is of approximately the same size. Similarly ambient poles 3a and 3c are approximately of the same size. Further, the width of each ambient pole is approximately the same as the space separating ambient pole 3a from ambient pole 3c.

As a result of the present design of closed magnetic circuits 12a and 12b, leakage flux and magnetic noise are reduced in comparison with prior art designs. In combination, closed magnetic circuits 12a and 12b and drive coils 6a and 6b are symmetrically disposed about carriage 5 so as to form electromagnetic motors 13a and 13b. An electrical signal supply is provided for each drive coil 6a and 6b for driving the carriage 5 along a guiding system comprising guide rails 11a, 11b, and 11c. Actuation forces provided by the pair of electromagnetic motors 13a and 13b result in a directional actuation toward the center of inertia of carriage 5 such that carriage 5 is efficiently driven toward a particular desired position in relation to memory locations of disk stack 18.

Drive coils 6a and 6b are preferably constructed of aluminum wire to conserve weight. Furthermore, drive coils 6a and 6b may be constructed without any support frame by means of adhesive or other wire coupling material. The coils 6a and 6b are fixed to coil fixation extensions 9a and 9b, for example, of a plate which is provided with holes 10 at top and bottom to further conserve weight. Coil fixation extensions 9a and 9b form parallel wings for mounting driving coils 6a and 6b.

Figure 4:
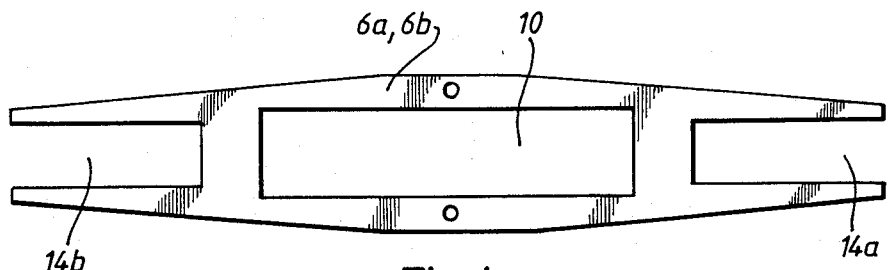
FIG. 4 is a plane view of a coil fixation plate for a carriage according to the present invention.

Referring briefly to FIG. 4, there is shown in close up view one such coil fixation extension. From the figure, the lightweight design may be seen comprising a rectangular hole 10, having outwardly tapered extended sides which still promote a strong lateral grasp of coils 6a and 6b, not shown, within open holes 14a and 14b, respectively. Coil fixation plates 9a and 9b comprise a ceramic material, for example, silicon nitride or other ceramic material. Such a ceramic material further contributes to the light weight and durability of the present coil fixation extensions.

Figure 6:
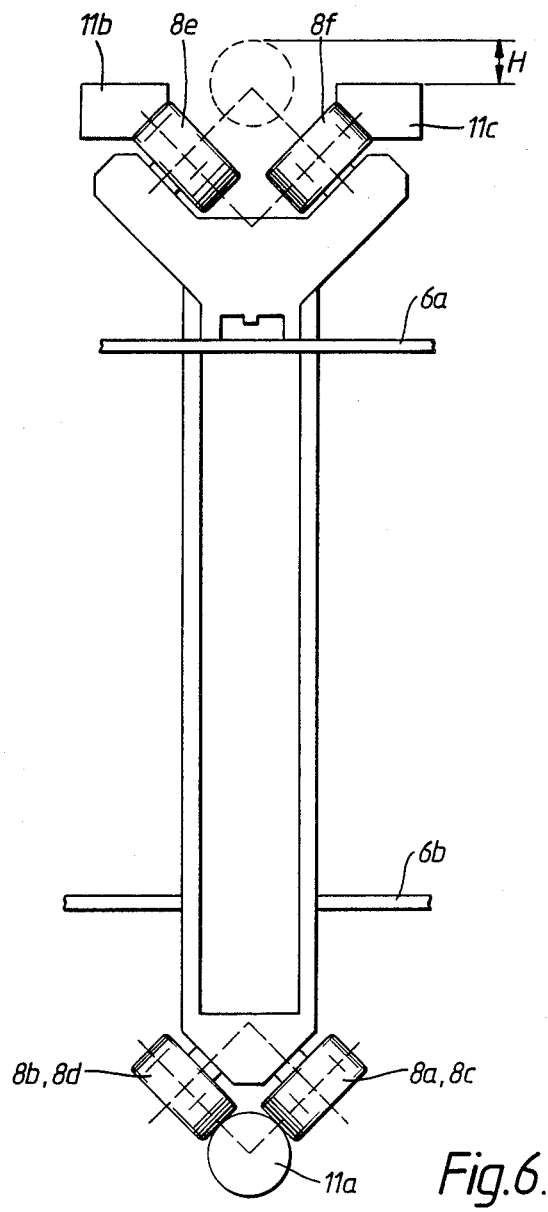
FIG. 6 is a front view of a carriage guiding system according to the present invention which further provides a comparison of the present arrangement shown in solid lines to one of the prior art, shown in phantom lines.

Referring again to FIG. 3, the carriage 5 is shown disposed between the electromagnetic motors 13a and 13b. Guiding the carriage 5 is a guiding means comprising guide rail 11a which has a circular cross section and guide rails 11b and 11c which each have an approximately rectangular cross section and one flat surface each for engaging an upper-most arrangement of rollers. In FIG. 3 are shown upper rollers 8e and 8f and lower rollers 8a, 8b, 8c and 8d for guiding carriage 5 along upper guide rails 11b and 11c and lower guide rail 11a respectively. The three guide rails 11a, 11b and 11c are respectively maintained as a magnetic ground for the magnetic circuits 12a and 12b. Referring both to FIGS. 3 and 6, it may be seen that guide rail 11c only is urged in the direction of guide rail 11a by spring 14. Guide rails 11a and 11b are fixed in relation to guide rail 11c, consequently, the carriage 5 itself is fixed in place permitting a stable arrangement of transducers 15. Each pair of rollers 8a, 8b and 8c, 8d respectively are arranged approximately in the form of a letter V. With respect to lower guide rail 11a, roller pairs 8a and 8b, 8c and 8d surround circular cross section guide rail 11a. A singular upper pair of guide rollers 8e and 8f engage respectively rectangular cross section guide rails 11b and 11c. These are also arranged in the form of the letter V.

Figure 1:
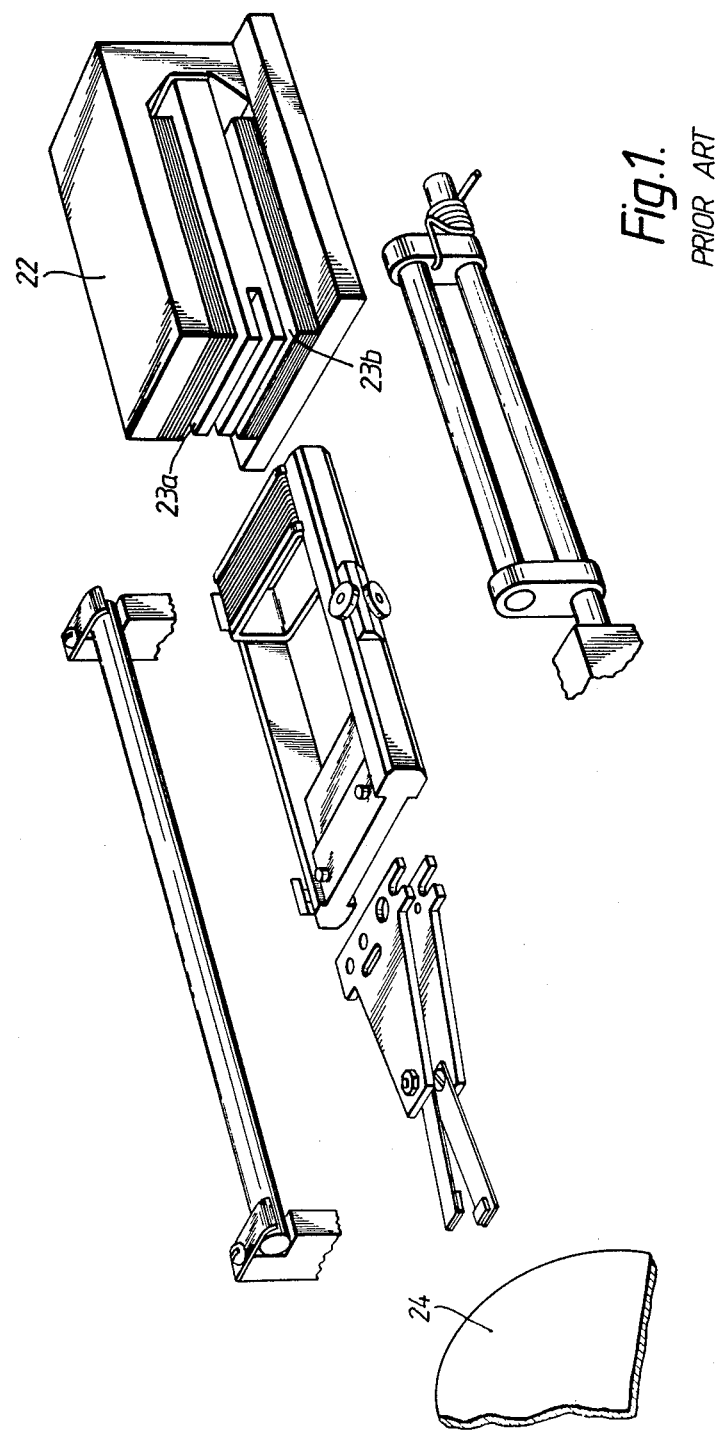
FIG. 1 is a disassembled perspective view of a first linear actuator known in the art.
Figure 2:
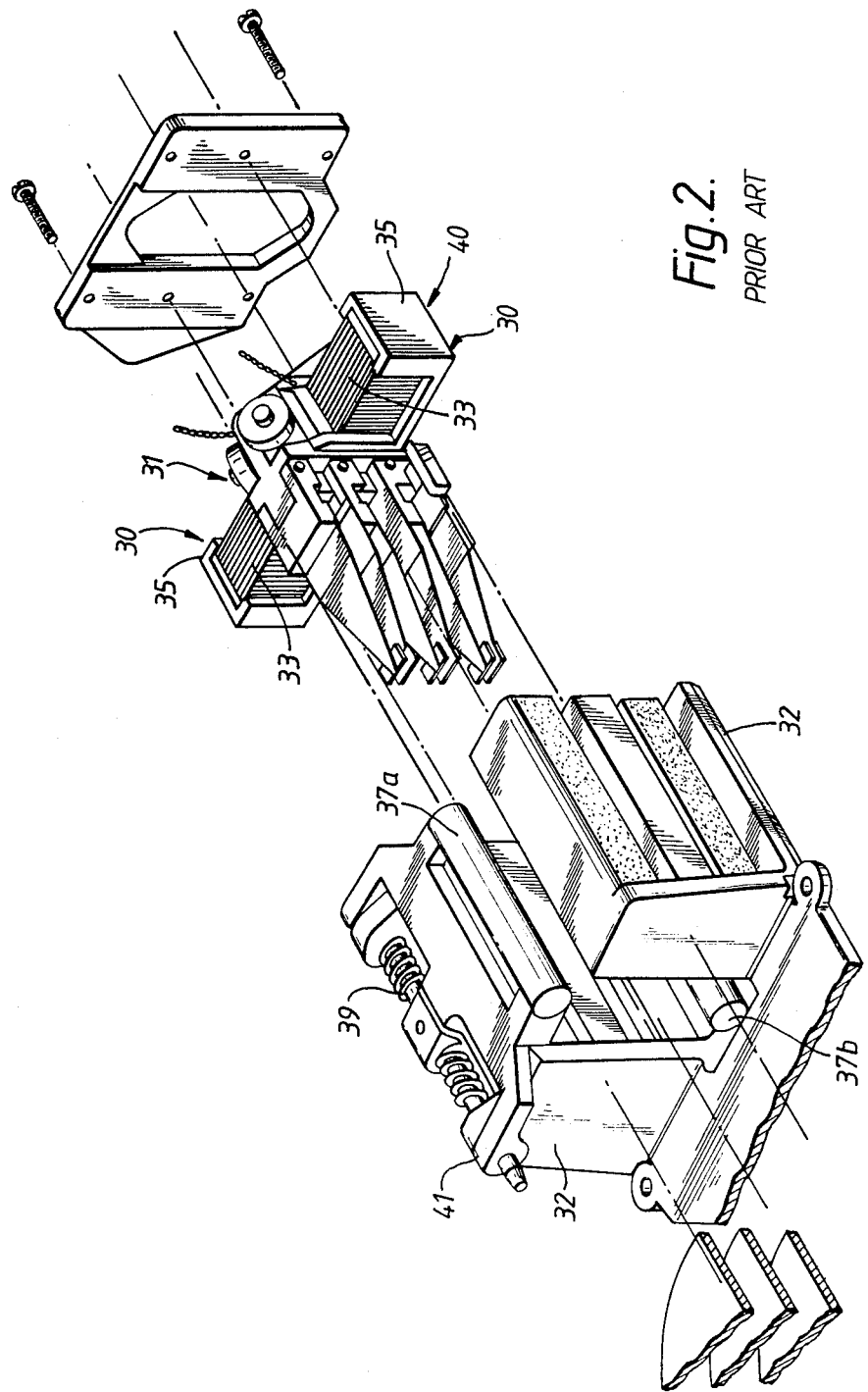
FIG. 2 is a disassembled perspective view of a second linear actuator known in the prior art.

Referring briefly to FIG. 6, the prior art unstable arrangement of guide rollers is shown surrounding a circular cross section guide rail in phantom lines. The instability is created in that, in accordance with either FIG. 1 or FIG. 2, the biasing means acts along a radius of a circle and so does not apply linear but rather arcuate bias. In the present arrangement, there is a coupling of flat surfaces and biasing is more linearly directed toward stable elements. Consequently, in accordance with the above-described construction of the present carriage guidance system, the linear actuator achieves rapid access time, is small and light weight, provides a reduction in magnetic noise and permits a more compact arrangement of transducer pairs 15.

By making the carriage 5 light in weight is possible to achieve rapid access time to obtain powerful actuation forces. In the present invention, the two electromagnetic motors 13a and 13b which each have four permanent magnets, for example, magnets 1a, 1b, 1c and 1d of motor 13a are symmetrically disposed about the carriage 5 to obtain powerful actuation forces. All four sides of the wound driving coils 6a and 6b are disposed in each of the four gaps between the four permanent magnets, for example, 1a, 1b, 1c, 1d, surrounding driving coil 6a and the sides of central poles 2a, 2b. Consequently, all four sides of the driving coils 6a and 6b are effectively used for driving, and the electromagnetic motors 13a and 13b operate at a very high efficiency and obtain powerful linear actuation forces. Moreover, the pair of electromagnetic motors 13a and 13b, symmetrically disposed about the carriage 5, generate equal and powerful actuation forces, and the resultant actuation forces are provided to the center of inertia of the carriage 5. Consequently, by directing the actuation forces to the center of inertia of the carriage, the carriage support system's sympathetic vibrations are not excited.

On the other hand, there are provided in the present invention considerable means for decreasing the weight of the entire carriage system to obtain powerful actuation force efficiencies. Firstly, as already described, the driving coils 6a and 6b should comprise aluminum wire and may be coupled together by adhesive, the driving coils not requiring a separate support frame. In this manner, the weight of the driving coils 6a, 6b, is about one-half as much as the weight of coils made of copper, even considering the flow of equal currents through the coils. Without departing from the spirit of the present invention, driving coils 6a and 6b may comprise copper-aluminum wire or pure copper wire replacing the aluminum wire, recognizing that some sacrifice in weight may be necessary but that an improvement in conductivity results.

Furthermore, according to the linear actuator of the present invention, all four sides of the driving coils 6a and 6b are used for driving, so the number of turns of each coil may be one-half as many as the number of turns required of the prior art coils. Again, such a design permits the driving coils and consequently the carriage to be very small in weight. Thirdly, as described before in connection with FIG. 4, the extended sides of the coil fixing plate 9a and 9b close to the carriage 5 are wide while the sides of the coil fixing plates 9a and 9b close to the driving coils 6a and 6b are narrow, further contributing to the lightweight of the carriage but promoting optimum strength for supporting the coils in a winged arrangement. Constructing the coil fixing plates 9a and 9b of ceramic material, for example, silicon nitride or other ceramic material, promotes strength and weight reduction. At the same time, they are separated by a sufficient distance to support driving coils 6a and 6b. Moreover, provision of the holes 10 in each plate 9a, 9b contributes to making the coil fixing plates light in weight but permits the carriage to operate at a high resonant frequency. According to FIG. 4, the driving coils 6a and 6b are disposed within side indentation 14a and 14b of the coil fixing plates 9a and 9b and they are fixed by lightweight adhesive or other fixing material.

Figure 5A:
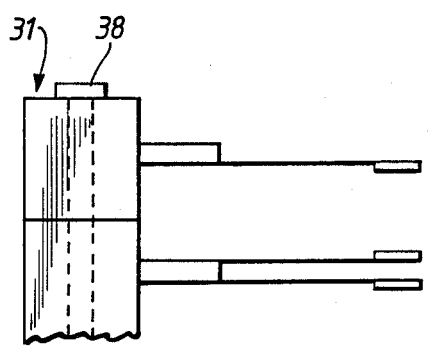
FIG. 5(a) is a side view of a prior art transducer support arm mounting arrangement.
Figure 5B:
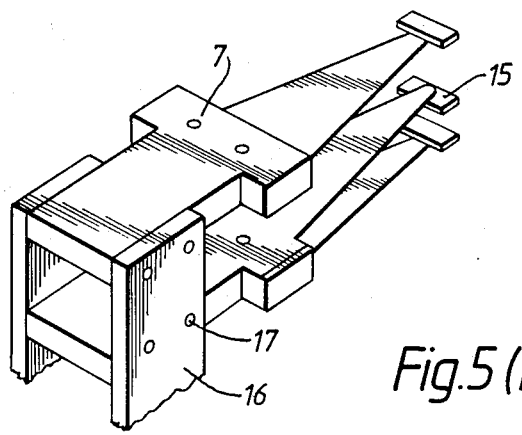
FIG. 5(b) is a perspective view of a transducer support arm mounting arrangement according to the present invention.

Fourthly, as shown in FIG. 5a, according to the prior art, when transducer support arms are stacked, the arms are typically fixed by a screw 38 lengthwise and comprise blocks 31, so the arms are necessarily made heavy and thick and are difficult to remove for maintenance purposes. On the other hand, as shown in FIG. 5b, according to the present invention, the transducer support arms 7 are fixed to side plates 16 which are disposed on each side of the support arms 7 be screws or pins 17 or an adhesive crosswise. In the present arrangement, the arms 7 can be made thin and light in weight. Furthermore, the arms 7 are separately positioned by the screws or pins 17, so the arms 7 may be detachable one by one for maintenance purposes. The entire arrangement of stacked arms 7 is mounted to carriage 5 as shown in FIG. 3. In accordance with this arrangement, it is convenient to exchange the transducers 15.

Moreover, the magnetic circuits 12a and 12b are closed magnetic circuits which are composed of central poles 2a and 2b covered by ambient magnetic poles above, below, to the left and right, and at front and back. Consequently, the leakage flux from the magnetic circuits is reduced, there is little magnetic noise, and the magnetic circuits can be disposed close to the disk stack 18, Therefore, the overall length of the actuator of the present invention from terminal poles 4a and 4b toward the disk stack 18 can be made very compact. Further, the driving coils 6a and 6b generate little magnetic noise even when high current levels pass through the driving coils 6a and 6b over short durations achieving a rapid access time.

Magnetic noise can be detected in prior art systems by the transducer pairs 15. However, in accordance with the present invention, the driving coils 6a and 6b are contained within the magnetic circuits 12a and 12b, so the magnetic noise is effectively shielded from the transducers and there is no adverse influence on the retrieval of data from the disk stack 18.

Since one guide rail 11a has a circular cross-section and the other guide rails 11b and 11c have a rectangular cross-section in the guiding system of the carriage 5, the overall stability of the present carriage is improved. The guiding system of the above construction seldom vibrates the carriage 5 as compared with the operation of the prior art two rail system of FIG.2. The guide rails 37a and 37b which each have circular cross-section are not perfectly fixed and can tend to exhibit some lateral movement because of the radical biasing structure 41. Briefly, the usual means for giving a carriage 40 pre-stressing is a spring 39, and the carriage 40 is pressed against a guide rail 37b by guide rail 37a. Guide rail 37a is mobile about the radius of a circle concentric with the biasing spring 39. Therefore, the carriage 40 is unstable about a hinged support 41 for guide rail 37a. On the other hand, referring to FIGS. 3 and 6 and according to the present invention, the carriage 5 is given pre-stressing by the guide rail 11c acted upon by downward biasing spring 14, and the carriage 5 is maintained by both the fixed guide rail 11a and the fixed guide rail 11b. Both the guide rails 11a, 11b are fixed, so positioning of the carriage 5 on the guide rails 11a and 11b can be performed with high precision; consequently, the carriage 5 is not unstable and the tranducers 15 can be precisely positioned. The fixed guide rails 11a and 11b are separated from one another by the carriage 5 and the guide rail 11c provides a pre-stressing of carriage 5 against the fixed guide rails 11a and 11b.

Furthermore, according to FIG. 6, the carriage 5 of the present invention compares favorably with the prior art in terms of the thickness of the guiding system of the carriage. The present guiding system comprising the guide rails 11a, 11b, and 11c, having a rectangular cross-section is thinner than the prior art system comprising the guide rails 37a and 37b having a circular cross-section by the additional thickness H. According to the present invention, the height of the carriage 5 then is thinner than that of the prior art by the thickness H.

In accordance with the present arrangement, a magnetic disk drive apparatus tends to permit an increase in the number of disks of disk stack 18, and the rapid access time permits an overall higher information rate of retrieval. Yet, it is possible to provide a lower profile for the disk drive apparatus by making the height of the carriage 5 close to the height of the disks of disk stack 18.

If an optical disk head is used in place of the plural magnetic transducer pairs 15, the linear actuator according to the present invention can equally be applied to advantage to reduce size and increase access speed despite the fact that no magnetic noise advantage is achieved. Furthermore, various modifications of the present invention will become possible for those skilled in the art after recieving the teachings of the present disclosure without departing from the scope of the claims which follow.

We claim:

1. In a memory storage apparatus having information recording media, a linear actuator for positioning a transducer device comprising at least one transducer at a desired location on said recording media, the linear actuator comprising:

a movable carriage; transducer mounting means for mounting said transducer at one end of said movable carriage;

carriage support means in a stationary position adjacent said information recording media for supporting said movable carriage for movement along a desired linear path to position said transducer relative to said information recording media; and driving means associated with said movable carriage and said carriage support means for driving said movable carriage along the desired linear path, said driving means including a pair of central poles which are symmetrically disposed along the direction of carriage motion, pairs of oppositely disposed permanent magnets which substantially surround each of said central poles and are separated therefrom by predetermined gaps, ambient poles which fix said permanent magnets and which surround said central poles, and a pair of terminal poles forming closed magnetic circuits with the ambient poles and with the terminal poles, and driving coils for the carriage which are completely disposed inside said predetermined gaps to generate actuation forces along a center of inertia of said carriage.

2. A linear actuator according to claim 1, wherein four permanent magnets are disposed around each one of said central poles.

3. A linear actuator according to claim 1, the carriage comprising coil mounting means including plate members separated by approximately the same thickness as the thickness of said driving coils, the coil mounting means for supporting the driving coils of the carriage.

4. A linear actuator according to claim 3, wherein the plate members are made of ceramic material.

5. A linear actuator according to claim 4, wherein the ceramic material is silicon nitride.

6. A linear actuator according to claim 3, wherein the coil mounting means including plate members has a parallel winged form.

7. A linear actuator according to claim 1, wherein the transducer mounting means comprises support arms which are composed of plural crosswise plate members, each to maintain at least one of said transducers in position and side plates disposed on opposite sides of said carriage to which side plates the crosswise plate members are directly fixed to determine the positioning of said crosswise support arms by a predetermined gap, the said side plates being fixed, in turn, to said carriage.

8. A linear actuator according to claim 7, wherein said arms are detachably attached to said side plates.

9. A linear actuator according to claim 1, wherein said driving coils are made of aluminum.

10. A linear actuator according to claim 1, wherein said carriage support means comprise a first, a second, and a third guide rail, the second and third guide rails being opposite to said first guide rail, said first guide rail and said second guide rail determining the positioning of said carriage, and said carriage being pre-stressed by said third guide rail.

11. A linear actuator according to claim 10, wherein said second and said third guide rails are respectively symmetrically arranged about said carriage.

12. A linear actuator according to claim 10, wherein the carriage comprises first pairs of rollers in rolling engagement with said first guide rail and another pair of rollers in rolling engagement with said second and third guide rails, the rollers for permitting linear displacement of said carriage.

13. A linear actuator according to claim 12, wherein said first pairs of rollers and said other pair of rollers are respectively arranged in the approximate form of a letter V.

14. A linear actuator according to claim 10, wherein said first guide rail has a circular cross-section and said second and third guide rails have a rectangular cross-section.

* * * * *